A. C. LODWIG & O. NAUMANN.
CULTIVATOR.
APPLICATION FILED AUG. 26, 1908.
923,541.
Patented June 1, 1909.
2 SHEETS—SHEET 1.
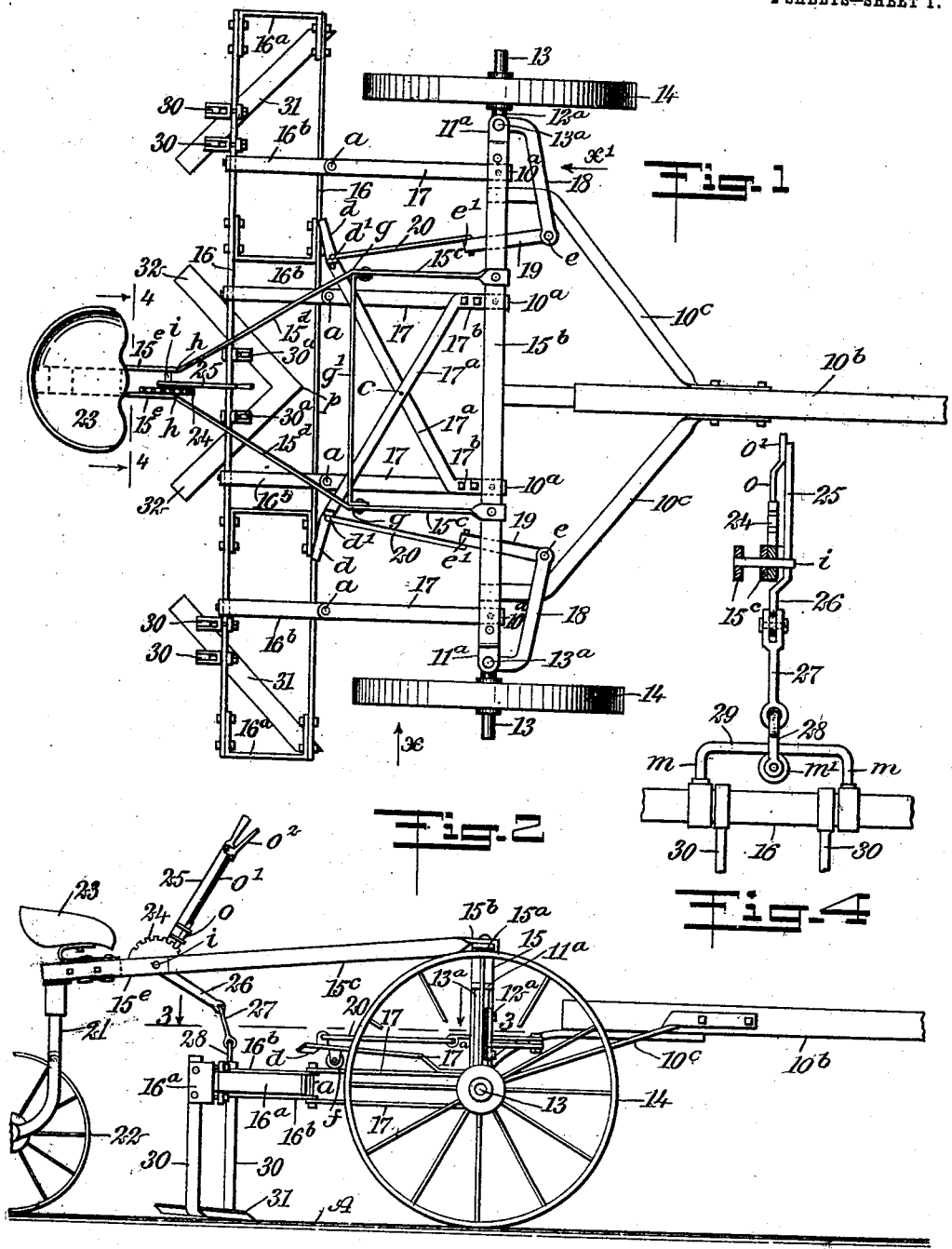
WITNESSES
INVENTORS
*Augustus C. Lodwig*
*Otto Naumann*
BY
ATTORNEYS

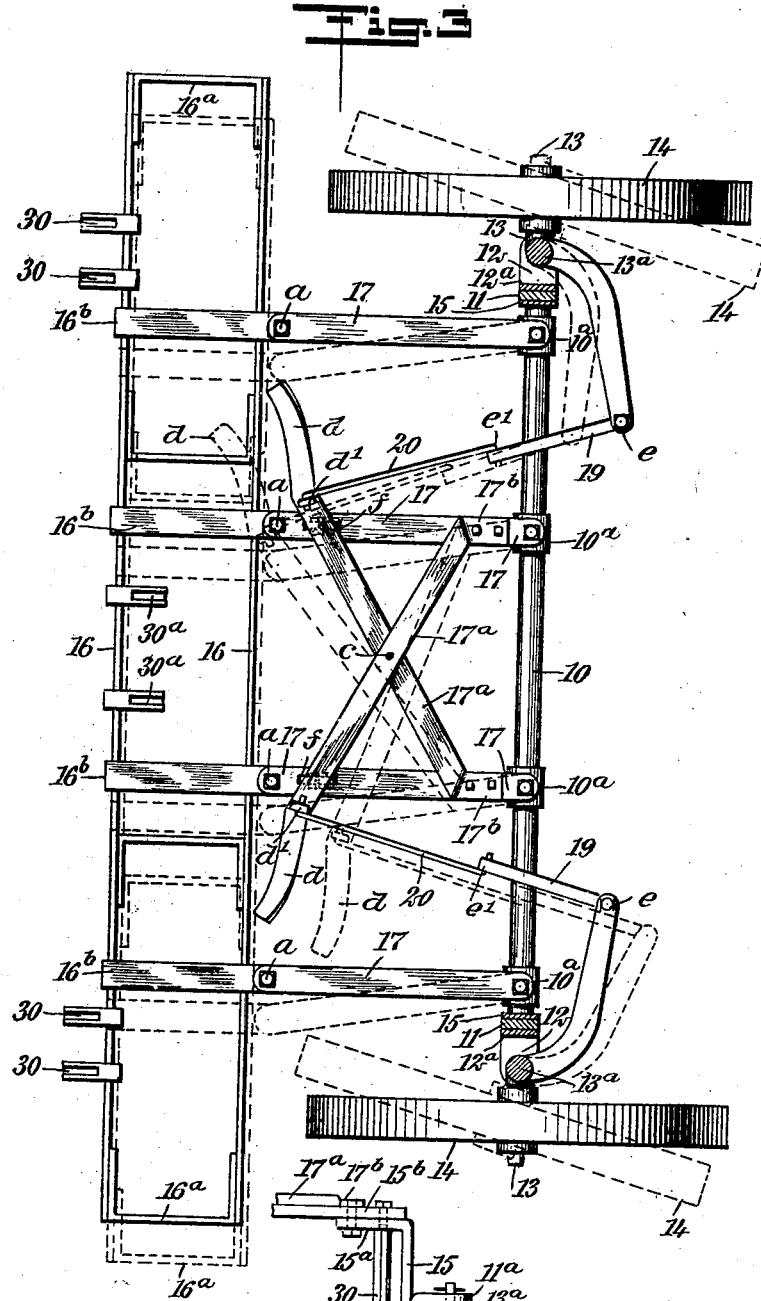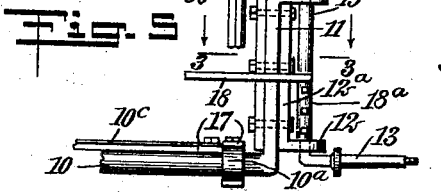

UNITED STATES PATENT OFFICE.

AUGUSTUS C. LODWIG AND OTTO NAUMANN, OF OXNARD, CALIFORNIA.

CULTIVATOR.

No. 923,541.  Specification of Letters Patent.  Patented June 1, 1909.

Application filed August 26, 1908. Serial No. 450,267.

*To all whom it may concern:*

Be it known that we, AUGUSTUS C. LODWIG and OTTO NAUMANN, both citizens of the United States, and residents of Oxnard, in the county of Ventura and State of California, have invented a new and Improved Cultivator, of which the following is a full, clear, and exact description.

This invention relates to a class of wheeled cultivators, having a plurality of spaced shovel blades, adapted for removing weeds and stirring up the soil between and near rows of growing plants.

One purpose of our invention is to provide novel details of construction for a cultivator of the class indicated, which render the machine very effective in operation, afford perfect control of the shovel blades, so that they may be adjusted laterally toward or from a row of plants, and be raised from the ground and lowered into engagement therewith, and at the time the blades are shifted laterally, so guide the wheels of the machine that they will speedily be caused to travel in a track that corresponds with the lateral adjustment given to the shovel blades.

A further object is to so construct and assemble the parts of the machine frame that it will be very light, strong and durable, and be easily controlled in the turning movement of the main traction wheels toward either side of the cultivator by foot pressure that also shifts the shovel blades correspondingly.

And a further purpose is to provide novel constructive details for the frame of the cultivator, that afford a wheeled support for the driver's seat which travels behind the shovel blades, and gives said seat such a relative position that shifting levers which control the lateral movements of the traction wheels and of the shovel blades, may be readily reached by the feet of the occupant of said seat, and also afford means convenient to the hand of the driver, for the elevation and depression simultaneously of all the shovel blades, as may be desired.

The invention consists in the novel construction and combination of parts as is hereinafter described and defined in the appended claims.

Reference is to be had to the accompanying drawings forming a part of this specification, in which similar characters of reference indicate corresponding parts in all the views.

Figure 1 is a plan view of the improved cultivator, having parts arranged for straight forward movement; Fig. 2 is a side view of the machine, seen in direction of the arrow $x$ in Fig. 1; Fig. 3 is an enlarged, partly sectional plan view showing a normal adjustment therefor by full lines, and a lateral adjustment of the same by dotted lines, the section being on the lines 3—3 in Figs. 2 and 5; Fig. 4 is an enlarged, partly sectional rear view on the line 4—4 in Fig. 1; and Fig. 5 is an enlarged, broken front elevational view, seen in direction of the arrow $x'$ in Fig. 1.

In the drawings, 10 indicates the main axle for support of the frame and other parts of the cultivator, and as is clearly shown in Figs. 3 and 5, the axle body is cylindrical. It may here be explained that the constructive details connected with each end of the axle body 10 are duplicated, hence a description of said details for one end thereof, and that are best shown in Fig. 5, will answer for the like parts at both ends of the axle.

At each end of the body 10 a standard 11 is bent upward and disposed vertically, and on the upper end of said standard a short arm $11^a$ is bent outward into a horizontal position, as shown in Fig. 5. An arm 12 that is complementary to the arm $11^a$, and that is formed on an upright extension $12^a$ thereof, is disposed parallel therewith by an attachment of said upright extension $12^a$ upon the outer surface of the standard 11, thus locating the arm 12 near the axle 10. A spindle 13 for the rotatable engagement of a traction wheel 14, is formed at its inner end with an upwardly turned rock shaft $13^a$, which is journaled near the spindle and upper end of said rock shaft, in the arms $11^a$ and 12.

Upon the inner side of each standard 11, an L-shaped bracket arm 15 is secured, and projects a distance above the arm $11^a$, an upper member $15^a$ on each bracket arm, projecting inwardly in the same horizontal plane, and upon said members a transverse top frame bar $15^b$ is mounted at its ends and thereto secured by bolts, as shown for one end thereof in Fig. 5.

A rectangular frame is provided for the support of a plurality of shovel blades as is hereinafter described, said frame comprising two side bars 16, spaced apart a suitable distance in parallel planes by end cross bars $16^a$, and also by four pairs of similar intervening cross bars $16^b$ which are disposed oppositely in pairs on the side bars 16. The cross bars $16^b$ are evenly spaced from the end cross bars $16^a$ and from each other, are firmly secured across the top and lower edges of the side bars 16, and all project an equal distance beyond the frame at one side bar thereof, which is forwardly disposed when arranged for service.

Upon the axle 10, at distances apart equal with that between the paired cross bars $16^b$, four collars $10^a$ are formed or secured. Two similar, flat connecting bars 17 are pivoted by similar ends upon each collar $10^a$, engaging the upper and lower sides thereof, and each pair of said connecting bars on a collar are extended rearwardly and lapped upon the forwardly projected ends of the paired cross bars $16^b$, whereon they are respectively pivoted by a cross bolt $a$, as shown in Fig. 2.

Upon two of the uppermost connecting bars 17, that are nearest to and equally distant from the longitudinal center of the main axle 10, two foot levers $17^a$, are secured by their forward ends $17^b$ near respective collars $10^a$, and, as shown in Figs. 1 and 3, the main portions of the foot levers $17^a$ are bent edgewise and laterally in opposite directions, so that their bodies cross each other at a point $c$, midway between the connecting bars they are secured upon, and at that point a perforation is formed in each foot lever. The length of the foot levers $17^a$ is such that their free ends which project rearward and sidewise, are disposed near the forward side bar 16 of the shovel blade supporting frame, and said end portions $d$ are bent edgewise to adapt them to receive foot pressure on their rear edges.

Upon each vertical rock shaft $13^a$, at its forward side and extended toward the bracket arm 12, a depending limb $18^a$ on a rock arm 18 is secured, said rock arms, that are respectively bent edgewise forward and toward each other in the same horizontal plane, having equal length, the limb $18^a$ of one rock arm appearing in Fig. 5. The ends $e$ of the rock arms 18 are respectively pivoted upon the forward ends of a coupling bar 19, these bars extending rearward, and having at their rear ends a rockable connection with the forward ends of similar link rods 20, as shown at $e'$ in Figs. 1, 2 and 3, the rear ends of the latter being jointed upon the foot levers $17^a$ respectively at points $d'$ near their end portions $d$.

Each foot lever $17^a$ is supported above and spaced from a respective connecting bar 17, by a small roller $f$ that is rotatably secured upon the under side of said lever, said connecting bars serving as tracks whereon the rollers rest and turn.

On the upper side of the top frame bar $15^b$, at an equal distance from its longitudinal center, two side bars $15^c$ of a top frame, are secured at their forward ends and thence extended rearward parallel with each other. At $g$ on each side bar, an obtuse, angular bend is formed that inclines these bars toward each other, these converged members $15^d$ projecting rearward above the shovel supporting frame. A transverse brace $g'$ is secured at $g$ between the frame members $15^c$. At a suitable point $h$, rearward of the transverse frame bars 16, the remaining portions of the top frame bars $15^d$ are bent, so as to dispose said portions $15^e$ near to and parallel with each other.

Between the frame members $15^e$ an upper horizontal arm on a depending hanger arm 21, is secured, the latter having a laterally projected spindle on its lower end, which receives a rotatable rear traction wheel 22.

A driver's seat 23 is mounted and secured upon the upper member of the hanger arm 21, and forward thereof between the frame members $15^e$ a sector 24 is secured on one of said members and projects above it; upon a short shaft $i$ that is journaled between the frame members $15^e$, a lever 25 is secured, from the lower end of which an arm 26 projects forward preferably at or near a right angle thereto. The free end of the arm 26 is jointed upon the upper end of a link bar 27, and as shown in Fig. 4 upon the perforated lower end of said link bar a clevis 28 is loosely mounted.

Upon the rear transverse frame bar 16 of the shovel blade supporting frame, a guide bar 29 is mounted, said guide bar being in the form of a metal rod having depending legs $m$ formed thereon, which are secured on said frame bar, and space the body portion 29 therefrom above and parallel with said frame bar 16.

Between the depending limbs $m$ of the clevis 28, a roller $m'$ is pivoted after said limbs have been passed down over the guide rod or bar 29, so as to loosely embrace it, which will adapt the roller for travel on the under side of the guide bar.

Upon the lever 25, a locking dog $o$ is slidably mounted and furnished with a rod $o'$ that extends along the lever to its upper end, where said rod is pivoted upon a rockable handle $o^2$ that by manipulation will reciprocate the dog. It will be seen in Figs. 2 and 4 that the dog $o$ normally engages the teeth of the sector 24, and if the lever 25 is inclined forwardly, the shovel knife frame will be permitted to assume a horizontal position. Furthermore, it will be noted that owing to the position given to the lever, a driver occupying the seat 23 may conveniently reach and manipulate said lever.

Upon the transverse parallel side frame members 16 of the shovel blade frame, standards 30 are secured by their upper ends, and project downward of a suitable length that is preferably equal for all said standards. A pair of the standards 30 are secured upon the rear frame bar 16, near each end thereof, and upon the lower ends of each pair of standards, a shovel blade 31 is secured near its rear end. The shovel blades are flat slabs of steel or other suitable metal, and have a cutting edge on each that is disposed toward the front end of the machine when said blades are arranged for service. Each blade 31 is inclined edgewise outward and forward and at their front ends each is secured upon the lower end of a standard 30, that projects downward from the front frame bar 16, near the adjacent end frame bar 16ª.

At each side of the longitudinal center of the rear transverse frame bar 16, a depending standard 30ª is secured thereupon, the lower ends whereof are secured upon the divergent members 32 of an essentially V-shaped shovel plow-blade, the angular point $p$ of which projects forwardly near the vertical plane of the front transverse frame bar 16, as appears in Fig. 1.

It will be noted in Fig. 2 that when the main traction wheels 14 and the rear traction wheel 22, are positioned upon level ground A, the shovel blades 31, 32 will all be adapted for operative engagement with the soil when the lever 25 is rocked forward and the dog thereon is engaged with teeth of the sector 24; furthermore, if the lever 25 is drawn rearward and locked fast to the sector 24, the shovel blades will all be raised from engagement with the ground.

Upon the main axle 10, a draft pole 10ᵇ is secured by its rear ends and thence extended forwardly, and is laterally braced at 10ᶜ as usual. It is to be understood, however, that we also contemplate the employment of a pair of shafts for the connection of a single draft animal with the machine, instead of a pair of the same.

In operation, assuming that the shovel blades 31, 32 are started between rows of growing plants they are to cultivate by stirring the soil near them, and that the wheels 14 are disposed at right angles with the axle 10, a progressive movement of the machine in a straight line may be maintained, by the driver occupying the seat 23, pressing equally upon the foot members $d$ on the foot levers 17ª. If there is a disposition had by the working parts to cause the approach of the shovel blades 31, 32 too near to a row of the plants, this can be instantly corrected by pressure of the foot upon a proper lever 17ª. This pressure, as is indicated by dotted lines in Fig. 3 will, by a lateral rocking movement of the connecting bars 17ª in a corresponding direction, move the shovel blade frame endwise a suitable degree, and the shovel blades in the same direction, so as to dispose the cutting edges of said blades nearer the plants toward which the frame 16, 16ª is shifted. It will be noted that the pressure exerted by the foot of the occupant of the seat 23 will instantly rock the arms 18, which will obviously turn the spindles 13, so as to change the trend of the traction wheels 14, in accord with the longitudinal shifting movement of the shovel blade supporting frame 16, 16ª, which will adapt the machine, when said traction wheels are again directed straight forward, to give the shovel blades a like forward movement nearer to the growing row of plants. It will be apparent, that the change in lateral adjustment of the shovel blades and traction wheels, may be simultaneously effected toward either side of the cultivator and in a greater or less degree, as the service requires.

As before explained, the adjustment of the lever 25 enables the driver to control the depth of introduction of the cultivator blades 31, 32 into the soil, and also effect the entire removal thereof from contact with the ground, this latter mentioned adjustment being necessary when the machine is being hauled over a road to a point in a field where it is to be put into service.

As hereinbefore mentioned, the foot levers 17ª where they lap on each other, are oppositely perforated, these perforations $e$ being alined with each other when the traction wheels are arranged for a straight forward movement; in this case, a bolt or pin is to be inserted down through the alined perforations in the foot levers, which will prevent any lateral movement thereof, and obviously hold the wheels at right angles to the axle 10.

Having thus described our invention, we claim as new and desire to secure by Letters Patent:

1. In a cultivator, an axle, laterally rockable spindles at the ends of the axle, a supported rectangular frame rearward of the axle and disposed parallel therewith, connecting bars pivoted at their ends respectively on the frame and axle, foot levers secured by similar ends on two of the connecting bars, the bodies of the levers crossing each other at an angle, each foot lever having a pedal on the free end, rock arms on upright rock shafts forming members of the spindles, and link connections between the ends of the rock arms and the free ends of the foot levers.

2. In a cultivator, an axle, upturned standards on the ends of said axle, arms on the standards and projected above them, a transverse top frame bar carried by said arms, a top frame extended rearward from the transverse top frame bar, the side members of said frame converging toward their rear ends, a depending hanger arm on the rear ends of said frame members, and a traction wheel rotatably supported on the lower portion of the hanger arm.

3. In a cultivator, a supported top frame, a transverse shovel-blade carrying-frame below the top frame, and means for manually adjusting the shovel-blade supporting frame from the top frame, said means comprising a sector on the top frame, a lever rockable on the top frame and carrying a dog that may lock between teeth on the sector, an arm projected at an angle from the lower end of the lever, a guide bar mounted on a side member of the shovel blade supporting frame, a roller loosely bearing on the guide bar, and linked connections between said roller and the outer end of the arm on the lever.

4. In a cultivator, an axle, rockable spindles at the ends of the axle, wheels on the spindles, a transversely extending blade-carrying frame, bars pivoted to the axle and to the said frame, and foot levers secured to the said bars and operatively connected with the said spindles.

5. In a cultivator, an axle, rockable spindles at the ends of the axle and having arms at their ends, wheels on the spindles, a transversely extending blade-carrying frame, bars pivoted to the axle and to the said frame, foot levers secured to the said bars adjacent to their connection with the axle, said levers being crossed and each having a pedal at its end, and a connection between each foot lever and an arm of a spindle.

6. In a cultivator, a main wheel supported frame, a blade-carrying frame, connections between the said frame and the axle of the main frame, a rearwardly extending and wheel supported seat frame, an operating lever, and a connection between the lever and the blade carrying frame, the connection having a sliding engagement with the blade carrying frame.

7. In a cultivator, a wheel supported frame, a blade carrying frame, bars pivotally connecting the blade carrying frame with the wheel supported frame, and foot levers secured to the said bars.

8. In a cultivator, a wheel supported frame, a blade carrying frame, bars pivotally connecting the blade carrying frame with the wheel supported frame, and foot levers having one end secured to the said bars and having their bodies crossing each other.

9. In a cultivator, a wheel supported frame, a blade carrying frame, bars pivotally connecting said blades, foot levers having their forward ends secured to the said bars and crossing each other, and rollers carried by the foot levers and traveling on said bars.

10. In a cultivator, a main wheel supported frame, a blade carrying frame, means pivotally connecting the blade carrying frame with the wheel supported frame, means for moving the blade carrying frame endwise, a wheel supported seat frame secured to the main wheel supported frame, an operating lever on the seat supporting frame, a link pivoted to the lever, and a loose connection between the link and the blade carrying frame.

In testimony whereof we have signed our names to this specification in the presence of two subscribing witnesses.

AUGUSTUS C. LODWIG.
OTTO NAUMANN.

Witnesses:
F. M. KIRK,
Mrs. L. R. KIRBY.